United States Patent [19]
Lee

[11] Patent Number: 5,921,099
[45] Date of Patent: Jul. 13, 1999

[54] AIR CONDITIONER TEMPERATURE CONTROL APPARATUS

[75] Inventor: Seon-Woo Lee, Suwon, Rep. of Korea

[73] Assignee: Samsung Electronics Co., Ltd., Rep. of Korea

[21] Appl. No.: 09/007,331

[22] Filed: Jan. 15, 1998

[30]      Foreign Application Priority Data

May 23, 1997 [KR]  Rep. of Korea ...................... 97-20486

[51] Int. Cl.⁶ .............................. G06F 17/00; F25B 1/00
[52] U.S. Cl. .................. 62/228.4; 236/78 D; 364/148.05
[58] Field of Search .................... 62/229, 228.4; 236/78 D; 364/148.05, 528.11, 528.34

[56]          References Cited

U.S. PATENT DOCUMENTS 5,148,977  9/1992  Hibino et al. ......................... 236/78 D
5,247,432  9/1993  Ueda ............................... 364/148.05 X
5,251,124  10/1993  Matsunaga ....................... 364/148.05 X
5,410,890  5/1995  Arima ................................... 62/228.4

*Primary Examiner*—William Wayner
*Attorney, Agent, or Firm*—Larson & Taylor

[57]           ABSTRACT

An air conditioner temperature control apparatus comprising: a remotely controlled signal receiving unit for setting-up room temperature; a temperature detecting unit for detecting room temperature; and a control unit for carrying out fuzzy logic by inputting the detected room temperature and the temperature error between detected room temperature and set-up room temperature and for compensating the temperature error to linear-control an operation frequency of the compressor by inputting the compensated temperature error.

3 Claims, 6 Drawing Sheets

FIG. 6
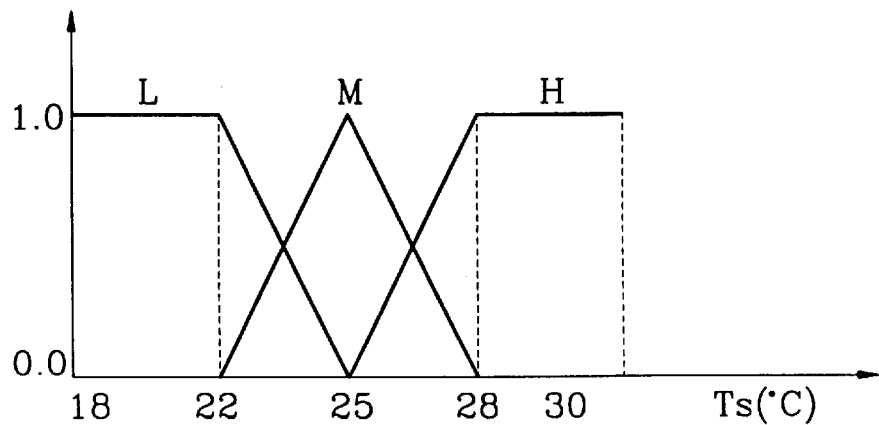
FIG. 7
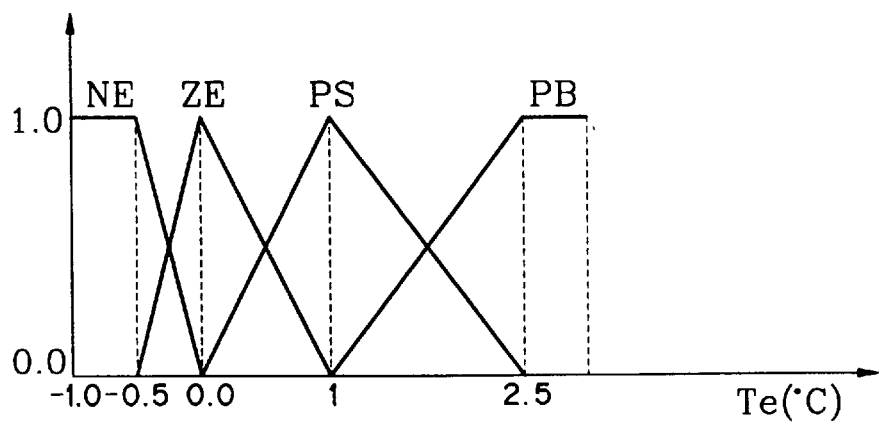
FIG. 8
| Ts / Te | L | M | H |
|---|---|---|---|
| NE | 0 | −0.5 | −1.0 |
| ZE | 0 | 0 | 0 |
| PS | 2 | 1 | 0.5 |
| PB | 3 | 2 | 1 |

AIR CONDITIONER TEMPERATURE CONTROL APPARATUS

BACKGROUND OF THE INVENTION

1. Field of the Invention

The present invention relates to an air conditioner temperature control apparatus which rapidly controls temperature of an air conditioner by way of fuzzy logic to compensate temperature error according to set-up temperature, temperature error between set-up room temperature and detected room temperature and temperature error change rate.

2. Description of the Prior Art

In general, an air conditioner temperature control apparatus is disclosed at U.S. Pat. No. 5,410,890. The air conditioner temperature control apparatus disclosed in the aforementioned patent, as shown in FIG. 1, includes a fuzzy control memory unit(21) for memorizing a control rule of membership function, a control apparatus(23) for carrying out fuzzy logic calculation according to the control rule memorized at the fuzzy control memory unit(21) by using temperature error between an detected room temperature and a set-up room temperature (input 1) and room temperature change (input 2) and for outputting a changed frequency of a compressor(22), a room temperature detecting unit(24) for detecting room temperature, and a room temperature change calculation unit(25).

At the air conditioner temperature control apparatus, the fuzzy logic calculation is carried out according to the control rule of the membership function at the fuzzy control memory unit(21) by inputting the temperature error between the room temperature and the set-up room temperature (input 1) and by inputting the room temperature error (input 2). The output changed frequency vale of the compressor (22) is controlled by a result of the fuzzy calculation, thereby changing the compressor frequency at every predetermined interval (t seconds) to control room temperature.

The room temperature (Tr) is detected by the room temperature detecting unit(24), whereby a room temperature change rate is calculated at the room temperature change calculation unit(25) whenever room temperature is detected. If room temperature is rapidly changed to be over set-up room temperature change value, the control apparatus(23) immediately carries out the fuzzy logic calculation to change frequency of the compressor(22).

However, as the compressor frequency is changed by the fuzzy logic calculation by inputting temperature error between the detected room temperature and the set-up room temperature and by inputting the room temperature change rate, there are problems in the conventional air conditioner temperature control apparatus in that, if the temperature error between detected room temperature and set-up room temperature is large, the temperature error is not quickly assimilated to carry out the air conditioning operation as rapidly as desired, and, even if the temperature error is small, an detected room temperature is not precisely matched with set-up room temperature, thereby not satisfying users' needs for comfort.

SUMMARY OF THE INVENTION

The present invention is presented to solve the aforementioned problems and it is an object of the present invention to provide an air conditioner temperature control apparatus which rapidly controls room temperature by assembling a whole fuzzy compensation unit at the front end of a proportional plus integral action (PI) control unit, thereby performing a fuzzy logic to compensate temperature error between set-up room temperature and detected room temperature.

In order to achieve the object of the present invention, there is provided an air conditioner temperature control apparatus, the apparatus comprising:

remotely controlled signal receiving means for setting-up room temperature;

temperature detecting means for detecting room temperature; and control means for carrying out fuzzy logic by inputting the detected room temperature and the temperature error between detected room temperature and set-up room temperature for compensating the temperature error to linear-control an operation frequency of the compressor by inputting the compensated temperature error.

BRIEF DESCRIPTION OF THE DRAWINGS

For fuller understanding of the nature and objects of the invention, reference should be made to the following detailed description taken in conjunction with the accompanying drawings in which:

FIG. 6 is a membership function of a set-up room temperature as an input to a whole fuzzy logic compensation unit;

FIG. 7 is a membership function of a temperature error as an input to a whole fuzzy logic front end compensation unit; and FIG. 8 is a Table of a input and output rule for illustrating an input and output relationship at a whole fuzzy logic compensation unit.

DETAILED DESCRIPTION OF THE INVENTION

Figure 1:
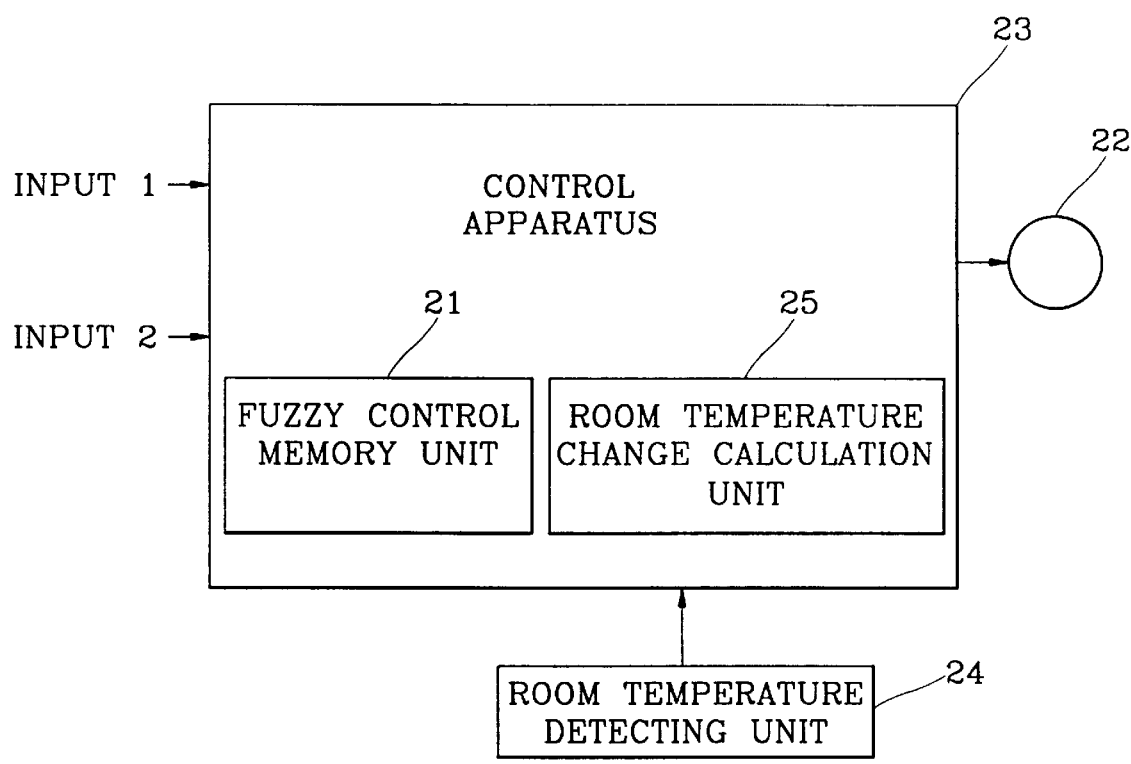
FIG. 1 is a view for illustrating structure of a conventional air conditioner temperature control apparatus.
Figure 2:
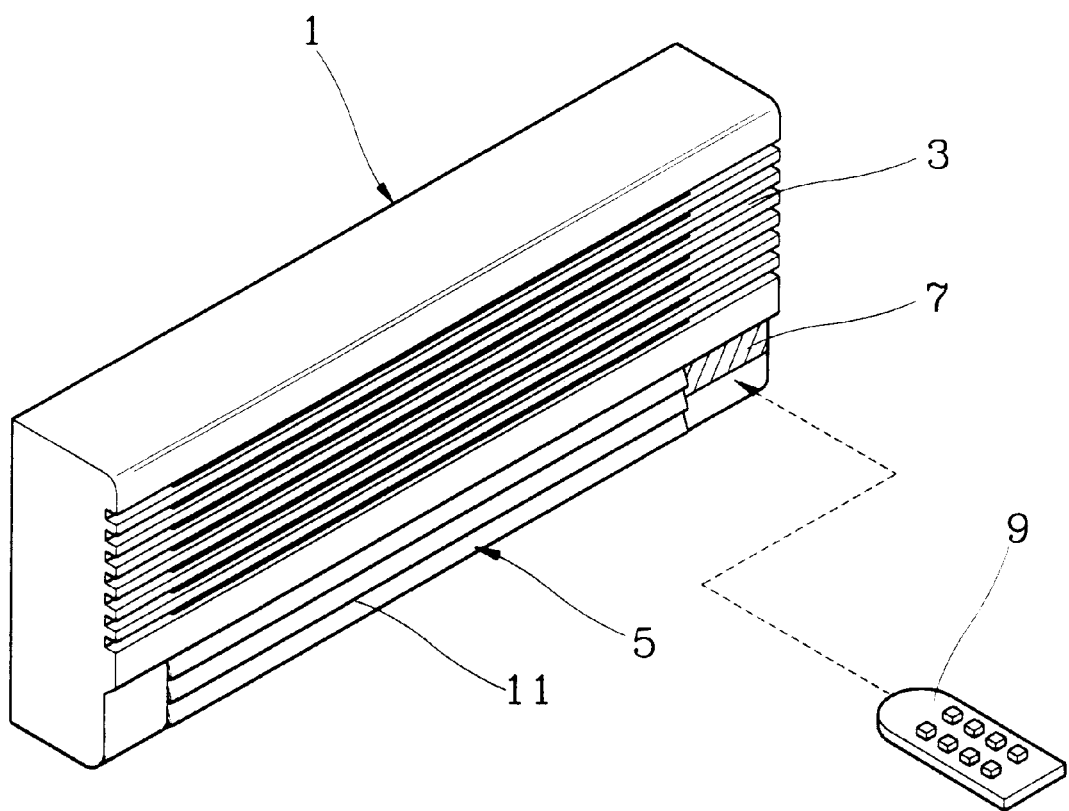
FIG. 2 is a perspective view of an indoor unit of an air conditioner in accordance with the present invention.

An embodiment of the present invention is described in detail with reference to the accompanying drawings. As shown in FIG. 2, an air conditioner is provided with an indoor unit of a main body (hereinafter referred to as an indoor unit), suction inlets(3) disposed at an upper front portion of the indoor unit for sucking room air, discharge outlets(5) disposed at a lower front portion of the indoor unit for discharging indoors air (warm or cold) heat exchanged by a heat exchanger.

Furthermore, there are a remotely controlled signal receiving unit(7) disposed at the right side of the discharge outlets(5) for receiving a remotely controlled signal sent from a remote controller, and an air direction vanes(11) disposed at the discharge outlets(5) for vertically controlling an air blowing direction to be discharged indoors through the discharge outlets(5).

The remote controller(9) is provided with a plurality of function keys for controlling the air conditioner, such as setting-up an operational mode (automatic, cooling, dehumidifying, air blowing, etc.), a starting and stopping operation, setting-up room temperature, an air blowing direction and the quantity of air to be discharged through the discharge outlets(5).

Figure 3:
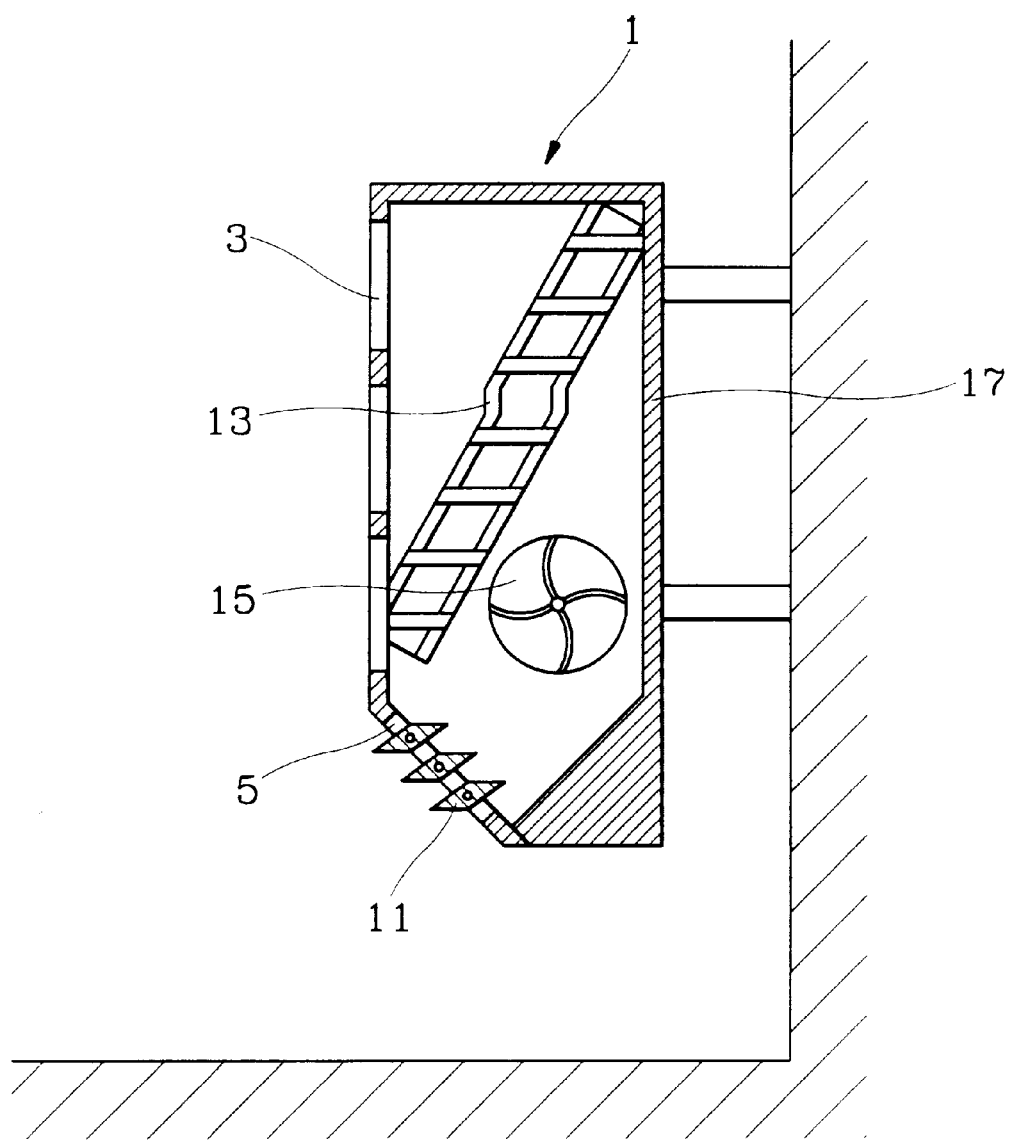
FIG. 3 is a lateral sectional view for illustrating installation of an indoor unit at a wall.

FIG. 3 is a lateral sectional view of the indoor unit shown in FIG. 2. Throughout the drawing, like reference numerals and symbols are used for designation of like or equivalent parts or portions for simplicity of illustration and explanation, and redundant references will be omitted.

As shown in FIG. 3 in the indoor unit, there are a long heat exchanger(13) disposed behind the suction inlets(3) for heat exchanging into cold or hot air by way of the evaporative latent heat of a coolant and an indoor fan(15) behind the heat exchangers 13) for sucking room air through the suction inlets(3) and for discharging indoors the air heat exchanged at the heat exchanger through the discharge outlets(5).

In addition, a duct member(17) is provided inside the indoor unit(1) for guiding the air current of the air sucked through the suction inlets(3) and discharged through the discharge outlets(5).

Figure 4:
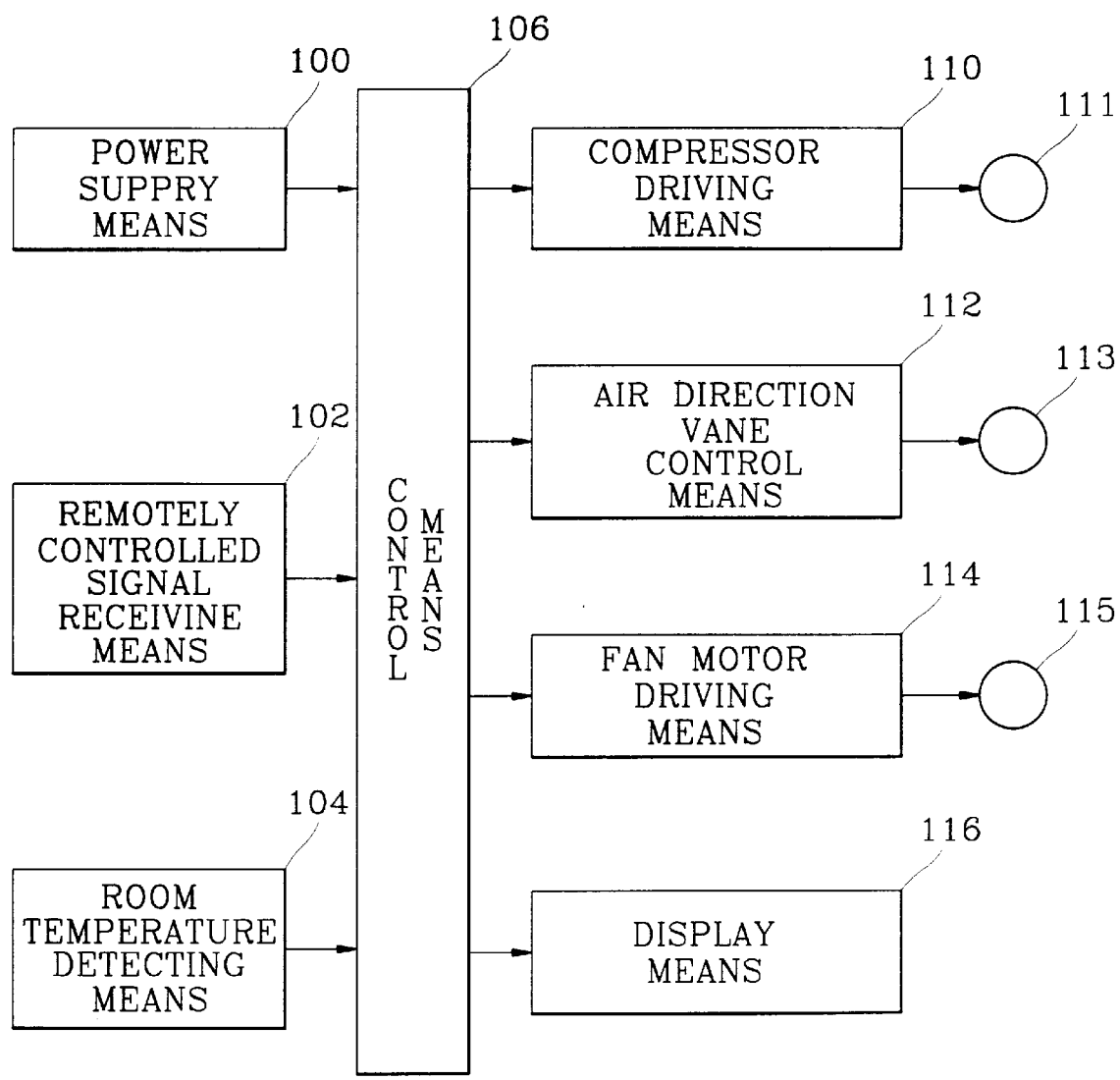
FIG. 4 is a block diagram of an air conditioner temperature control apparatus in accordance with an embodiment of the present invention.
Figure 5:
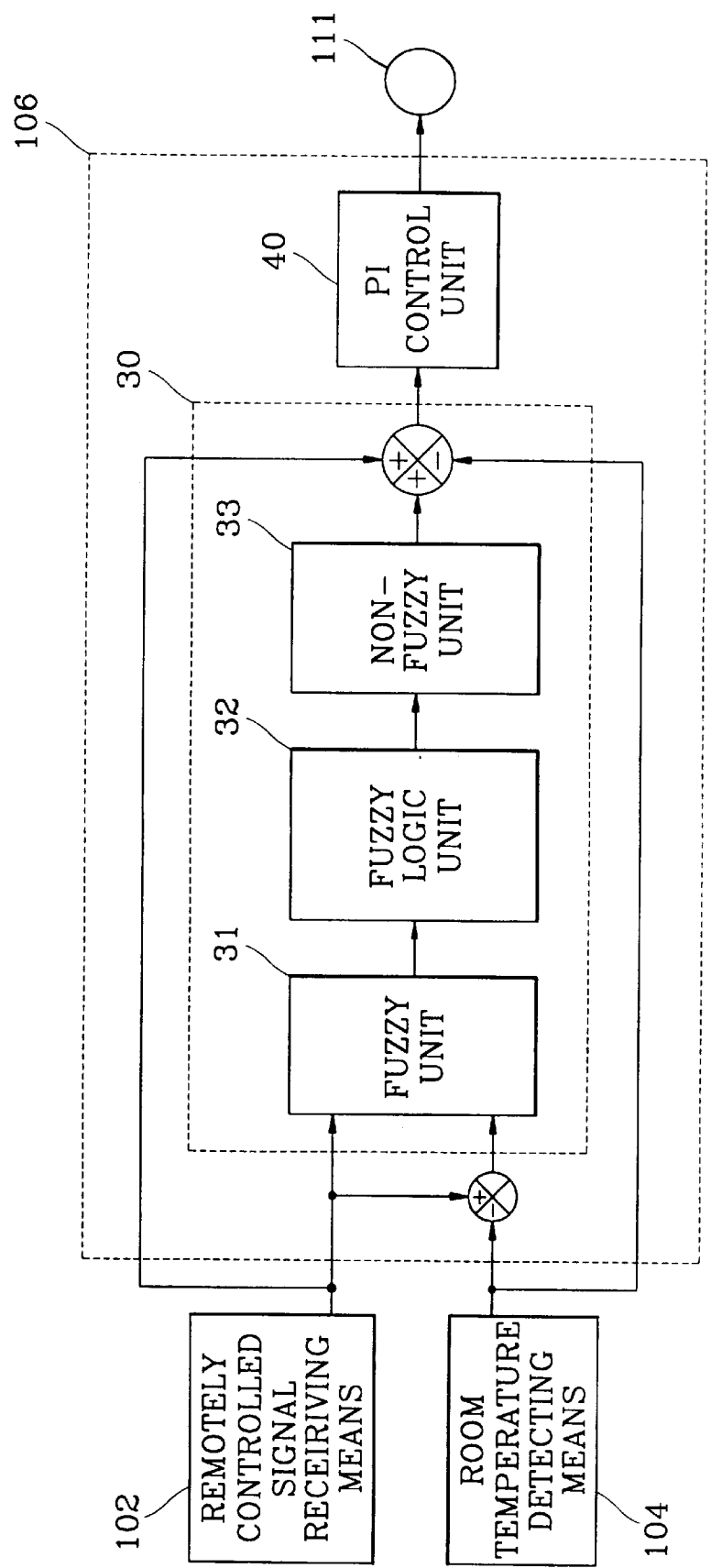
FIG. 5. is a block diagram for illustrating fuzzy logic of an air conditioner temperature control apparatus in accordance with an embodiment of the present invention.

Next, circuits to control temperature of the air conditioner is described with reference to FIGS. 4 and 5. As shown in FIGS. 4 and 5, power supply means(100) changes commercial alternating current power supplied from a power source terminal (not shown) into predetermined direct current voltage necessary for the operation of the air conditioner and outputs it.

The remotely controlled signal receiving means(102) is for receiving an ultra violet light signal sent from the remote controller(9) as an user manually set-ups an operational mode (automatic, cooling, dehumidifying, air blowing, etc.), room temperature, an air blowing direction and the like with function keys. The room temperature detecting means(104) detects temperature (Tr) of the room air sucked through the suction inlets(3).

The control means(105) is a micro-computer which controls general operations of the air conditioner by receiving the direct current voltage output from the power supply means(100) to initialize the air conditioner and by determining the operational conditions set-up by the user with the ultra violet light signals accepted by the remotely controlled signal receiving means(102).

The control means(105) includes: a whole fuzzy compensation unit(30) for carrying out fuzzy logic with the input of the temperature error (Te) between set-up room temperature (Ts) and the detected room temperature (Tr), (Te=Ts−Tr) to compensate the temperature error; and a PI control unit(40) for linear-controlling with an input of a compensated temperature error, addition of a compensation term ( r ) which is an output from the whole fuzzy compensation unit(30) and temperature error (Te).

The compressor driving means(110) receives a control signal from the control means(106) according to the room temperature error between the room temperature (Tr) detected by the room temperature detecting means(104) and the room temperature set-up by the user (Ts) to drive the compressor(111). The air direction control means(12) receives a control signal from the control means(106) to control a direction of the air discharged through the discharge outlets(5) according to the air blowing direction set-up by the user with a remote controller(9) to drive an air direction motor(113) and to move air direction vanes(11).

In addition, the fan motor driving means(114) receives a control signal output from the control means(106) for controlling the air blowing speed discharged through the discharge outlets(5) according to the air direction set-up by the user with the remote controller(9). The display means(116) shows the operational mode (automatic, cooling, dehumdifying, air blowing, heating, etc), the temperature (Ts) set-up with the remote controller(9) and the general operational state of the air conditioner.

As shown in FIG. 5, the whole fuzzy compensation unit(30) includes: a fuzzy unit(31) for inputting the room temperature (Ts) set up with the remotely controlled signal receiving means(102) and the temperature error (Te) to fuzzify same; a fuzzy logic unit(32) for performing a fuzzy logic by utilizing the set-up temperature (Ts) and the temperature error(Te) fuzzyfied at the fuzzy unit(31) according to a minimum—maximum fuzzy method; and a non-fuzzy unit(33) for calculating an area occupied by respective output values according to the minimum and maximum output values obtained by the fuzzy logic unit(32) for determining a weight center of the areas and to add same to the temperature error (Te) to take same as the compensated temperature error.

FIG. 6 shows a membership function of the set-up room temperature(Ts) input from the whole fuzzy compensation unit(30), namely an input membership function illustrating the range of 18° C. through 30° C. where cooling capacity of the air conditioner is variably changed.

In FIG. 6, signs of M, L and H respectively symbolizes a 'medium phase', a 'low phase' and a 'high phase' of the set-up room temperature. FIG. 7 shows a membership function of the temperature error (Te), an input to the whole fuzzy compensation unit(30). It illustrates the membership function at the range of −1° C. through 10° C., the temperature error between the set-up room temperature (Ts) and the detected room temperature (Tr).

In FIG. 7, symbols of ZE, NE, PS and PB respectively mean 'no', 'low', 'slightly high' and 'very high' of the temperature error (Te). FIG. 8 is a Table of an input and output rule for illustrating an input and output relationship of the whole fuzzy compensation unit(30), namely a Table of the fuzzy control rule for illustrating the compensation term as a result of the input values of the set-up temperature and the temperature error (Te).

Next, operational effect of the air conditioner temperature control apparatus. First of all, when power is applied, the power supply means(100) (not shown) changes commercial alternating current voltage supplied from the alternating current power terminal into predetermined direct current voltage necessary to drive the air conditioner and outputs the direct current power to each circuit and the control means (106).

Therefore, the control means(106) initializes the air conditioner by using the direct current voltage output from the power supply means(100). At this time, the user sets up with the remote controller(9) an operational mode (for instance, cooling) and room temperature (Ts) and an air blowing direction as desired and presses a key to start the air conditioner.

In the remote controller, the remotely controlling signals related to the function keys are codified by a predetermined protocol to demodulates into and send ultra violet light signals. If the ultra violet light signals are sent from the remote controller(9), the remotely controlled signal receiving means(102) demodulates the ultra violet light signals into electrical signals to send to the control means(106).

Accordingly, the control means(106) outputs a control signal to drive an indoor fan(15) to the fan motor driving means(114) for carrying out the cooling operation of the air conditioner. Then, the fan motor driving means(114) controls the rotation frequency of the indoor fan motor(115) to drive the indoor fan(15) according to a set-up air blowing direction.

If the indoor fan(15) is driven, room air starts to be sucked through the suction inlets(3), the room temperature detecting means(104) detects temperature of the room air sucked through the suction inlets(30), and the control means(106) receives analog data of the room temperature detected by the room temperature detecting means(104) to change into digital data.

Then, the control means(106) calculates the temperature error (Te) by using the set-up room temperature (Ts) and the room temperature (Tr) detected by the room temperature detecting means(104), and the fuzzy unit(31) of the whole fuzzy compensation unit(30) uses the set-up room temperature(Ts) and the temperature error(Te) with reference to the membership function in FIGS. 6 and 7 and a Table of the control rule in FIG. 8 to calculate a compensation term ( r ) as follows:

$$r = \frac{\sum_{i=1}^{12} w_i y_i}{\sum_{i=1}^{12} w_i}, i = 1, \ldots 12$$

where, r is a compensation term, an output of the whole fuzzy compensation unit(30), $w_1$ is a compatibility degree value at each control rule, showing a minimum value of compatibility obtained from the each compatibility degree function calculated with the two input values given in the Table of the control rule. In addition, $y_i$ is a value output from the Table of the control rule shown in FIG. 8, namely, −3 through 3. The aforementioned fuzzy logic is for calculating the compensation term ( r ) of weighted sum by using 12 of weight and central values thereof.

As a result, the aforementioned formulas illustrate whole procedures of fuzzy logic calculation carried out at the fuzzy logic unit(32) and the non-fuzzy unit(33). The compensation term ( r ) is added to the temperature error (Te) to obtain the compensated temperature error (e').

Next, the compensated temperature error (e') is used by the PI control unit(40) to calculate a final control output value with addition of a term proportional to d' and a term proportional to an integrated value of e' in the following formulas (1) and (2) as follows:
a proportional term by multiplying an invariable number to the compensated temperature error (e'):
Up=Kp e' . . . (1)
The integral term:

$$Ui = KI \sum_{\tau=t^o}^{t} e'(\tau) \qquad (2)$$

The final compressor frequency is obtained by adding the proportional term and the integral term.
The operation frequency of the compressor=Up+Ui
When the PI control unit(40) outputs the compressor frequency, the compressor driving means(110) drives the compressor(111) according to the final compressor frequency.

If the compressor(111) is driven, the room air sucked through the suction inlets(3) is heat exchanged into cold air by way of the evaporative latent heat of the coolant flown into the heat exchanger(13). The cold air heat exchanged at the heat exchanger(13) moves upwards to carry out the cooling operation at an angle of the air direction vanes vertically tilted at the discharge outlets(5).

Apparent from the foregoing description, there is an operational effect in the air conditioner temperature control apparatus of the present invention in that room temperature is rapidly controlled as the whole fuzzy compensation unit is installed in front of the PI control unit to carry out fuzzy logic calculation with set-up temperature and temperature error to compensate the temperature error between set-up room temperature and detected room temperature.

What is claimed is:

1. An air cnditioner temperature control apparatus comprising:

remotely controlled signal receiving means for setting-up room temperature;

temperature detecting means for detecting room temperature; and control means for carrying out fuzzy logic by inputting the detected room temperature and the temperature error between detected room temperature and set-up room temperature and for compensating the temperature error to linear-control an operation frequency of the compressor by inputting the compensated temperature error.

2. The air conditioner temperature control apparatus, as defined in claim 1, wherein the control means comprises:

a whole fuzzy compensation unit for carrying out fuzzy logic with the input of the temperature error between set-up room temperature and the detected room temperature to compensate the temperature error; and a PI control unit for linear-controlling with an input of a compensated temperature error, addition of a compensation term which is an output from the whole fuzzy compensation unit and temperature error.

3. The air conditioner temperature control apparatus, as defined in claim 1, wherein the whole fuzzy compensation unit comprises:

a fuzzy unit for inputting the room temperature set up with the remotely controlled signal receiving means and the temperature error to fuzzify same;

a fuzzy logic unit for performing a fuzzy logic by utilizing the set-up temperature and the temperature error fuzzyfied at the fuzzy unit according to a minimum— maximum fuzzy method; and a non-fuzzy unit for calculating an area occupied by respective output values according to the minimum and maximu output values obtained by the fuzzy logic unit for determining a weight center of the areas and to add same to the temperature error to take same as the compensated temperature error.

* * * * *